United States Patent [19]

Lusis et al.

[11] 4,251,138

[45] Feb. 17, 1981

[54] METHOD OF PRODUCING SOLID ELECTROCHROME ELEMENT

[76] Inventors: Andrei R. Lusis, ulitsa Maskavas, 379, kv. 84; Yanis K. Klyavin, ulitsa Blaumana, 25, kv. 1, both of Riga; Talivaldis V. Zamozdik, ulitsa Rainisa, 126, Jurmala; Juris L. Lagzdons, ulitsa Lacha, 2, kv. 10; Oyars A. Rode, ulitsa Auseklya, 6a, kv. 4, both of Riga; Yanis Y. Pinnis, ulitsa Maskavas, 421, kv. 28, Riga, all of U.S.S.R.

[21] Appl. No.: 964,909

[22] Filed: Nov. 30, 1978

Related U.S. Application Data

[63] Continuation of Ser. No. 751,973, Dec. 17, 1976, abandoned.

[30] Foreign Application Priority Data

Dec. 22, 1975 [SU] U.S.S.R. .............................. 2197452

[51] Int. Cl.$^3$ .............................................. G02F 1/17
[52] U.S. Cl. .................................... 350/357; 427/124; 427/125; 427/126.1; 427/126.2; 427/126.3
[58] Field of Search ................... 350/357; 427/58, 124, 427/125, 126.1, 126.2, 126.3; 29/570

[56] References Cited

U.S. PATENT DOCUMENTS 3,578,843  5/1971  Castellion ............................ 350/357

OTHER PUBLICATIONS

Weast et al., *Handbook of Chemistry and Physics,* 47th Ed., The Chemical Rubber Co., Cleveland, 1966, p. E-180.

*Primary Examiner*—Evan K. Lawrence
*Attorney, Agent, or Firm*—Haseltine and Lake

[57] ABSTRACT

A method of producing a solid electrochrome element comprises depositing a layer of an electrochrome material onto a substrate having an electrically conducting layer in a vacuum from about $10^{-6}$ mm Hg to about $5.10^{-2}$ mm Hg at a vaporization temperature of from about 1,200° C. to about 2,500° C., the substrate temperature being maintained within a temperature range from about room temperature to about 500° $C_x$; and coating the electrochrome layer with a layer of insulating material vaporized in a vacuum from about $10^{-7}$ to about $10^{-4}$ mm Hg at a temperature of from about 1,300° C. to about 2,000° C., the substrate temperature being kept within a temperature range from about room temperature to about 300° C. The solid electrochrome elements produced by this method and characterized by a fast speed of action.

2 Claims, 1 Drawing Figure

U.S. Patent  Feb. 17, 1981  4,251,138
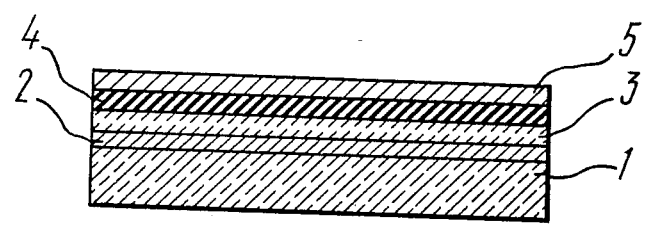

METHOD OF PRODUCING SOLID ELECTROCHROME ELEMENT

This is a Rule 60 Continuation of U.S. patent application Ser. No. 751,973, filed Dec. 17, 1976, abandoned.

BACKGROUND OF THE INVENTION

The invention relates to methods of producing electro-optical elements and, in particular, to methods of producing solid electrochrome elements.

Electrochrome elements are employed in light intensity modulation systems and, in particular, they can be used to make gates for passing and reflected light modulators, electrically and optically controlled transparencies, segment and matrix displays, optical data input and output devices, optical memory systems, silverless photoplates and other optoelectronic devices.

A solid electrochrome element is made as two electrodes with a layer of an electrochrome material and a layer of an insulation material being located therebetween.

There is known a method of producing a solid electrochrome element, consisting in that a conducting substrate which serves as one electrode is at first covered by a layer of an insulating material, which is from 0.001 to 1.0 microns thick, then by a layer of an electrochrome material, which is from 0.1 to 100 microns thick, and finally by a layer of a conducting material, which is about 100 Å thick, by means of thermal vaporization at a vacuum of $10^{-5}$ mm Hg (cf., for example, U.S. Pat. No. 3,521,941).

This method is deficient in that the elements made in conformity therewith possess long coloring and decoloring periods, which are from 30 seconds to several minutes at relatively high voltages from 2 to 10 volts.

SUMMARY OF THE INVENTION

It is an object of this invention to provide a method of producing a faster acting solid electrochrome element.

This and other objects are achieved by that in a method of producing a solid electrochrome element made as two electrodes with a layer of an electrochrome material and a layer of an insulation material located therebetween, consisting in that a conducting substrate which is one of the electrodes is successively coated by vacuum vaporization by a layer of an electrochrome material, a layer of an insulation material and a layer of a conducting material which is the second electrode, according to the invention, vaporization of the electrochrome material is performed in a vacuum from about $10^{-5}$ to about $5 \cdot 10^{-2}$ mm Hg at a vaporization temperature from about 1,200° C. to about 2,500° C., the temperature of the substrate being maintained within a temperature range from about room temperature to about 500° C., whereas vaporization of the insulating material is performed in a vacuum from about $10^{-7}$ to about $10^{-4}$ mm Hg at a temperature from about 1,300° C. to about 2,000° C., the temperature of the substrate in this case being maintained within a range from the room temperature to 300° C.

It is advisable that, if the substrate is made of glass coated with an electrically conductive layer, its temperature while it is being coated with electrochrome material be kept within a range from about room temperature to about 400° C.

This permits considerable increase of the speed of action of solid electrochrome elements made in conformity with the disclosed method.

DETAILED DESCRIPTION

The invention will now be described in greater detail with reference to specific embodiments thereof, taken in conjunction with the accompanying drawing, wherein a solid electrochrome element is shown schematically in the Figure.

The proposed method is mainly used to produce solid electrochrome elements made as "sandwich structures." At first a layer of an electrochrome material 3 which is 0.1-100 microns thick is deposited onto a substrate 1 (see Figure) coated with an electrically conductive material 2, which is heated within a temperature range from about the room temperature to about 500° C., in vacuum at a residual gas pressure from about $10^{-6}$ to $5 \cdot 10^{-2}$ mm Hg and at a vaporization temperature within a range of about 1,200° C. to about 2,500° C. Then a layer of an insulating material 4 which is 0.001-1 micron thick is deposited at a residual gas pressure of from about $10^{-7}$ to about $10^{-4}$ mm Hg and at a vaporization temperature from about 1,300° C. to about 2,000° C. The temperature of substrate in this case is kept within a range from about the room temperature to about 300° C.

And finally, the last to be deposited is a layer of an electrically conducting material 5 at a vacuum from about $10^{-5}$ to about $10^{-4}$ mm Hg and at a vaporization temperature from about 1,000° C. to about 1,800° C., the temperature of the substrate 1 being kept within a range from about room temperature to about 200° C.

Conducting materials can be metals, for example, gold, silver, aluminum and others, as well as metal oxides, for example, indium oxide or others. The electrochrome material 3 can be, for example, tungsten trioxide $WO_3$, molybdic trioxide $MoO_3$ and the insulating material 4 can be magnesium fluoride $MgF_2$, calcium fluoride $CaF_2$ and others.

In this way the method can be used to manufacture elements with a speed of action within a range from 0.01 to 1.0 (1/v.sec.), where the speed of action is defined as the ratio of the optical density change to a unit of time and the voltage of the linear part of the time characteristic of the integral light element, that is $$S = \frac{\Delta D}{\Delta t \, U},$$

where
 S: the element speed of action,
 $\Delta D$: change in optical density,
 $\Delta t$: period of time in seconds,
 U: control voltage of the element.

EXAMPLE 1

The substrate 1 with the conducting layer 2, which is one electrode, is coated at the room temperature in a vacuum of the order of $5 \cdot 10^{-5}$ mm Hg and at a vaporizer temperature of 1,400° C. by a 0.5-2 micron thick layer of the electrochrome material 3, then a 500 Å thick layer of the insulating material 4 at a vacuum of $3 \cdot 10^{-5}$ mm Hg and at a temperature of 1,350° C., as well as a 200 Å thick layer of the conducting material 5 which is the second electrode, at a temperature of 1,500° C. and in a vacuum of about $2 \cdot 10^{-5}$ mm Hg.

In this way an element is produced, which is transparent to light in its initial state and possesses a speed of action $S=0.03$ (1/v.sec).

EXAMPLE 2

The substrate 1 with the conducting layer 2 is heated to a temperature of 200° C. and is coated by a 0.5-2 micron thick layer of the electrochrome material 3 in a vacuum of about $5 \cdot 10^{-5}$ mm Hg and at a temperature of 1,400° C., by a 500 Å thick layer of the insulating material 4 in a vacuum of $3 \cdot 10^{-5}$ mm Hg and at a temperature of 1,350° C. and by a 200 Å thick layer of the conducting material 5 in a vacuum of $10^{-5}$ mm Hg and at a temperature of 1,500° C.

The device is transparent to light and possesses a speed of action $S=0.73$ (1/v.sec).

EXAMPLE 3

The substrate 1, in particular a glass one, with a conducting layer 2 is heated to a temperature of 400° C. and is coated by a 0.5-2 micron thick layer of the electrochrome material 3 in a vacuum of $5 \cdot 10^{-5}$ mm Hg and at a temperature of 1,400° C., then cooled to a temperature of 200° C. and the layers of the insulating and conducting materials are deposited thereon as described above.

The element is light blue initially, the coloring disappears after the first decoloration cycle. The speed of action $S=0.32$ (1/v.sec.).

EXAMPLE 4

The substrate 1 with the conducting layer 2 is coated at the room temperature by the electrochrome material 3 by vaporizing it in a vacuum of $2 \cdot 10^{-4}$ mm Hg at a vaporization temperature of 1,500° C., then a layer of the insulating and conducting materials are deposited as described above.

The thus produced element is colorless initially and its speed of action $S=0.15$ (1/v.sec.).

The table of main conditions for deposition of electrochrome and insulating layers is given below, considering that other layers in all examples are applied similarly according to the known technology.

| No. | Substrate temp. C° | Electrochrome layer | | Insulating layer | | Speed of Action $\frac{1}{v.sec.}$ |
|---|---|---|---|---|---|---|
| | | vacuum mm Hg | Temp. of vapor. C° | vaccum mm Hg | Temp. of vapor. C.° | |
| 5 | room | $5.10^{-5}$ | 1,500 | $3.10^{-5}$ | 1,350 | 0.03 |
| 6 | room | $5.10^{-5}$ | 1,600 | $3.10^{-5}$ | 1,350 | 0.02 |
| 7 | room | $2.10^{-3}$ | 1,500 | $3.10^{-5}$ | 1,350 | 0.07 |
| 8 | 200 | $5.10^{-5}$ | 1,500 | $3.10^{-5}$ | 1,350 | 0.05 |
| 9 | 200 | $5.10^{-5}$ | 1,600 | $3.10^{-5}$ | 1,350 | 0.02 |
| 10 | 200 | $2.10^{-4}$ | 1,600 | $3.10^{-5}$ | 1,350 | 0.11 |
| 11 | 200 | $2.10^{-3}$ | 1,500 | $3.10^{-5}$ | 1,350 | 0.09 |
| 12 | 400 | $5.10^{-5}$ | 1,500 | $3.10^{-5}$ | 1,350 | 0.02 |
| 13 | 400 | $5.10^{-5}$ | 1,600 | $3.10^{-5}$ | 1,350 | 0.05 |
| 14 | 400 | $2.10^{-4}$ | 1,500 | $3.10^{-5}$ | 1,350 | 0.22 |
| 15 | 400 | $2.10^{-3}$ | 1,500 | $3.10^{-5}$ | 1,350 | 0.02 |
| 16 | 200 | $5.10^{-5}$ | 2,000 | $3.10^{-5}$ | 1,350 | 0.01 |
| 17 | 200 | $5.10^{-5}$ | 1,500 | $10^{-4}$ | 1,350 | 0.01 |
| 18 | 200 | $5.10^{-5}$ | 1,500 | $3.10^{-4}$ | 1,900 | 0.02 |

The solid electrochrome elements produced by the disclosed method are simple to manufacture, possess high speed.

The solid electrochrome elements produced by the disclosed method are simple to manufacture, possess high speed of action, which makes the area of their application wider.

What is claimed is:

1. A method of manufacturing a solid electrochrome element having two electrodes, comprising the steps of applying a layer of electrochrome material to an electrically conductive substrate which serves as one of the electrodes of said electrochrome element by vaporizing said material at a temperature of from about 1,200° C. to about 2,500° C. in a vacuum from about $10^{-6}$ to about $5 \times 10^{-2}$ mm Hg, the temperature of said substrate being kept within a range of from about room temperature to about 500° C.; coating said electrochrome layer with a layer of an insulating material by vaporizing said insulating material at a temperature of from about 1,300° C. to about 2,000° C. in a vacuum from about $10^{-7}$ to about $10^{-4}$ mm Hg, the temperature of said substrate being kept within a range from about room temperature to about 300° C.; and coating said layer of insulating material with a layer of electrically conductive material which serves as the second electrode by vaporizing said electrically conductive material at a temperature of from about 1,000° C. to about 1,800° C. in a vacuum from about $10^{-6}$ mm Hg to about $10^{-4}$ mm Hg, the temperature of said substrate being kept within a range from about room temperature to about 200° C.

2. A solid electrochrome element as prepared according to claim 1, having a speed of action within the range from 0.01 to 1.0 (1/v.sec).

* * * * *